US012049265B2

(12) United States Patent
Recker et al.

(10) Patent No.: US 12,049,265 B2
(45) Date of Patent: Jul. 30, 2024

(54) ROLLER ASSEMBLY FOR GROUND-ENGAGING TRACK SYSTEM

(71) Applicant: Caterpillar Inc., Peoria, IL (US)

(72) Inventors: Roger Lee Recker, Dunlap, IL (US); Mircea Dumitru, Washington, IL (US); Zachary T. Donlan, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 701 days.

(21) Appl. No.: 17/128,504

(22) Filed: Dec. 21, 2020

(65) Prior Publication Data

US 2022/0194496 A1     Jun. 23, 2022

(51) Int. Cl.
   *B62D 55/15*     (2006.01)

(52) U.S. Cl.
   CPC .................. *B62D 55/15* (2013.01)

(58) Field of Classification Search
   CPC .......... B62D 55/14; B62D 55/15; B60B 37/04
   USPC ......................................................... 305/136
   See application file for complete search history.

(56) References Cited

U.S. PATENT DOCUMENTS

| 2,211,472 | A | * | 8/1940 | Klein | B21C 47/30 |
|||||| 242/571.6 |
| 2,789,438 | A | * | 4/1957 | Roland | B62D 55/15 |
|||||| 384/255 |
| 2,915,346 | A | * | 12/1959 | Stallman | B62D 55/15 |
|||||| 305/136 |
| 2,990,220 | A | * | 6/1961 | Malone | B62D 55/15 |
|||||| 384/486 |
| 6,364,438 | B1 | | 4/2002 | Hasselbusch et al. | |
| 6,435,629 | B1 | | 8/2002 | Egle et al. | |
| 6,457,786 | B1 | | 10/2002 | Hallsten | |
| 6,474,754 | B1 | | 11/2002 | Hasselbusch | |
| 7,213,894 | B2 | | 5/2007 | Yamamoto et al. | |
| 9,550,536 | B2 | | 1/2017 | Johannsen et al. | |
| 10,086,889 | B2 | * | 10/2018 | Kita | B60B 37/04 |
| 10,724,639 | B2 | | 7/2020 | Haas | |
| 2006/0181149 | A1 | | 8/2006 | Oertley | |
| 2011/0121643 | A1 | | 5/2011 | Mulligan | |
| 2012/0056473 | A1 | | 3/2012 | Hashimoto et al. | |
| 2014/0125116 | A1 | | 5/2014 | Weeks et al. | |

(Continued)

FOREIGN PATENT DOCUMENTS

| CA | 2720821 | A1 | * | 5/2011 | ............. | B62D 55/15 |
| CN | 203142832 | U | * | 8/2013 | ............. | B62D 55/15 |
| CN | 105873815 | | | 8/2016 | | |

(Continued)

*Primary Examiner* — S. Joseph Morano
*Assistant Examiner* — Eva L Comino

(57) ABSTRACT

A roller assembly for a ground-engaging track system includes a roller forming a shaft bore, and a roller shaft within the shaft bore and having a circumferential ramp surface. A roller retention system for the roller assembly includes a roller retention collar with an outer peripheral surface, and an inner peripheral surface that may include a wedge surface structured to friction fit the retention collar, within a collar bore in the roller, upon the circumferential ramp surface to limit axial displacement of the roller upon the roller shaft. The roller assembly may include two roller retention collars supporting the roller against axial displacement without use of thrust washers or the like, and fixing the roller and roller shaft to rotate together relative to a track roller frame.

20 Claims, 4 Drawing Sheets

(56) References Cited

U.S. PATENT DOCUMENTS

2019/0322325 A1 10/2019 Schroyer et al.
2020/0386271 A1 12/2020 Abello et al.

FOREIGN PATENT DOCUMENTS

| GB | 239931 | * | 6/1924 | ............ | B60B 37/04 |
|----|--------|---|--------|--------------|------------|
| JP | S517638 | | 1/1976 | | |
| JP | H08505338 | | 6/1996 | | |
| JP | 2013530082 | | 7/2013 | | |

* cited by examiner

ROLLER ASSEMBLY FOR GROUND-ENGAGING TRACK SYSTEM

TECHNICAL FIELD

The present disclosure relates generally to a ground-engaging track system, and more particularly to a roller assembly in a ground-engaging track system having roller retention collars clamped to a roller and limiting axial displacement of the roller upon a shaft fixed to rotate with the roller.

BACKGROUND

A wide variety of machines utilize tracks as ground-engaging propulsion elements. Such tracks typically include a plurality of a rotatable track-engaging elements such as a drive sprocket, one or more idlers, carrier rollers, and track rollers. The track forms an endless loop moved about the rotating elements during operation. Ground-engaging track systems are typically operated in harsh off-highway environments. In an effort to optimize service life of the track system components, and avoid unplanned machine downtime, components in such track systems are typically built to be quite robust. Contact between and among the components, often influenced by the presence and/or type of substrate materials, tends to cause wear of the components over time. Most machine applications require travel up, down, or traversing inclines, traveling over hard and uneven substrate materials, pushing or pulling loads, and other activities causing track system components to experience a variety of types of loads during service. Managing and mitigating loads in ground-engaging track systems has been the subject of much engineering effort over the years.

In the case of an idler in a track system, for example, certain known designs employ thrust washers, bearings, or plates that contact the idler during rotation upon a shaft to react side loads generally directed along or parallel to an axis of rotation of the idler. The use of thrust washers or the like is generally successful in reacting side loads that might otherwise excessively wear, damage, or cause performance degradation of the equipment. Thrust washers, plates, and the like, especially in direct contact with an idler, can nevertheless require additional complexity and number of components in track systems, as well as creating servicing and replacement challenges. One known ground-engaging track system employing an idler group is set forth in U.S. Pat. No. 9,550,536 to Johannsen et al. While the strategy set forth in Johannsen undoubtedly has various applications, there is always room for improvement, development of alternative strategies, and application to different types of machines or off-highway environments.

SUMMARY OF THE INVENTION

In one aspect, a roller assembly for a ground-engaging track system includes a roller defining a roller center axis and having an outer tread surface, and an inner roller surface forming a shaft bore and a collar bore extending axially outward of the shaft bore. The roller assembly further includes a roller shaft having a first shaft end, a second shaft end, a middle roller support section, and a circumferential ramp surface transitioning between the first shaft end and the middle roller support section and enlarged in diameter in a direction of the middle roller support section. The roller assembly further includes a roller retention collar having a roller-facing inside surface, an outside surface, and bolt holes extending between the roller-facing inside surface and the outside surface, for clamping the roller retention collar to the roller. The roller retention collar further includes an outer peripheral surface sized to fit the retention collar within the collar bore, and an inner peripheral wedge surface forming a shaft hole for positioning the roller retention collar upon the roller shaft. The shaft hole is enlarged in diameter in a direction of the roller-facing inside surface and sized to friction fit the roller retention collar upon the circumferential ramp surface, such that axial displacement of the roller upon the roller shaft is limited.

In another aspect, a ground-engaging track system includes a roller assembly having a roller defining a roller center axis and having a shaft bore extending between a first axial side and a second axial side of the roller, and a roller shaft. The roller shaft includes a first circumferential ramp surface, a second circumferential ramp surface, and a middle roller support section extending between the first circumferential ramp surface and the second circumferential ramp surface and positioned within the shaft bore. The track system further includes a roller retention system including a first retention collar positioned about the roller shaft upon the first axial side and having a first inner peripheral wedge surface, and a second retention collar positioned upon the roller shaft upon the second axial side and having a second inner peripheral wedge surface. The first retention collar is clamped to the first axial side of the roller and friction-fitted upon the first circumferential ramp surface based on clamped contact between the first inner peripheral wedge surface and the first circumferential ramp surface. The second retention collar is clamped to the second axial side of the roller and friction-fitted upon the second circumferential ramp surface based on clamped contact between the second inner peripheral wedge surface and the second circumferential ramp surface.

In still another aspect, a roller assembly for a ground-engaging track system includes a roller defining a roller center axis and including an outer tread surface, and an inner roller surface forming a shaft bore extending between a first axial side of the roller having a first side surface and a second axial side of the roller having a second side surface. The roller assembly further includes a roller shaft having a first shaft end, a second shaft end, and a middle roller support section that is enlarged relative to the first shaft end and the second shaft end and positioned within the shaft bore. The middle roller support section, together with the roller, forms a keyed roller-to-shaft joint fixing the roller and the roller shaft against relative rotation. The roller assembly further includes a first retention collar coaxially arranged about the roller shaft and clamped to the first axial side of the roller in axial facing contact with both of the first side surface and the middle roller support section, such that the roller is fixed against axial displacement upon the roller shaft in a first direction. The roller assembly further includes a second retention collar coaxially arranged about the roller shaft and clamped to the second axial side of the roller in contact with both of the second side surface and the middle roller support section, such that the roller is fixed against axial displacement upon the roller shaft in a second direction.

DETAILED DESCRIPTION

Figure 1:
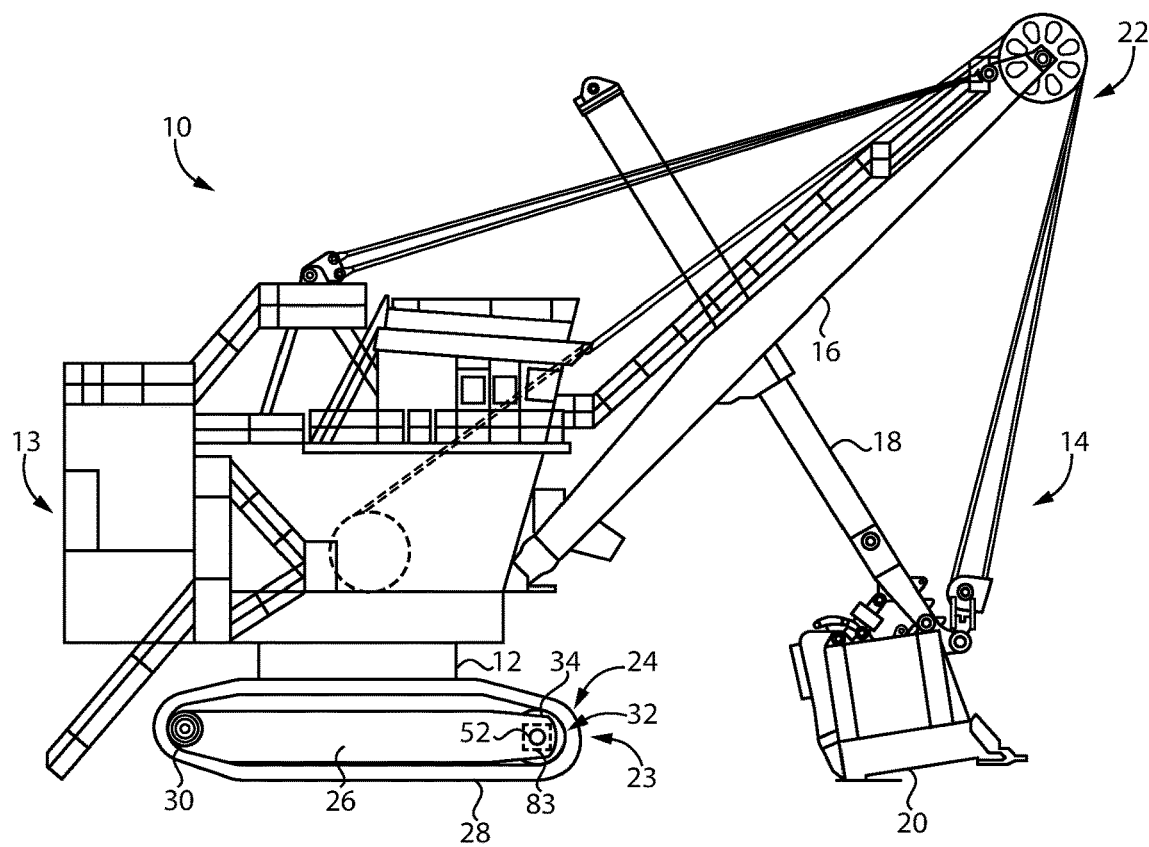
FIG. 1 is a side diagrammatic view of a machine, according to one embodiment.

Referring to FIG. 1, there is shown a machine 10 according to one embodiment, and including a frame 12, an upper machine assembly 13 supported on frame 12, and a lower machine assembly 23. Machine 10 includes an implement system 14 having a boom 16, a dipper 18 rotatably supported by boom 16, and a bucket 20. Machine 10 is illustrated in the context of a rope shovel having a cable system 22 that can be operated to front-load bucket 20 such as might be used to load material at a working face in a mine. Machine 10 might be a different type of machine in other instances, such as a hydraulic front shovel, a track-type tractor, a track-type loader, an excavator, or a variety of other types of tracked equipment. Lower machine assembly 23 includes a ground-engaging track system 24 having a track roller frame 26, a track 28, a drive sprocket 30, and an idler roller 34. Another track associated with substantially identical components is hidden from view in FIG. 1. Track 28 will typically include a plurality of coupled together track links, attached to or formed integrally with track shoes and forming an endless loop extending about rotatable elements. Also in the illustrated embodiment, track 28 has an oval configuration, however, it should be appreciated that a so-called "high drive" configuration with an elevated drive sprocket and both a front idler and a back idler could be used in some embodiments. Idler roller 34 is part of a roller assembly 32 supported by track roller frame 26 and also including a roller shaft 52. Ground-engaging track system 24 and roller assembly 32 may be equipped with a roller retention system 83 that fixes idler roller 34 and roller shaft 52 together for rotation during operating ground-engaging track system 24, without the use of thrust washers, thrust bearings, plates, or the like, in contact with idler roller 34 itself, as further discussed herein. While implementation of the present disclosure in the context of an idler is a practical strategy, in other instances idler roller 34 (hereinafter "roller 34") could be a different type of roller in a ground-engaging track system in a machine.

Figure 2:
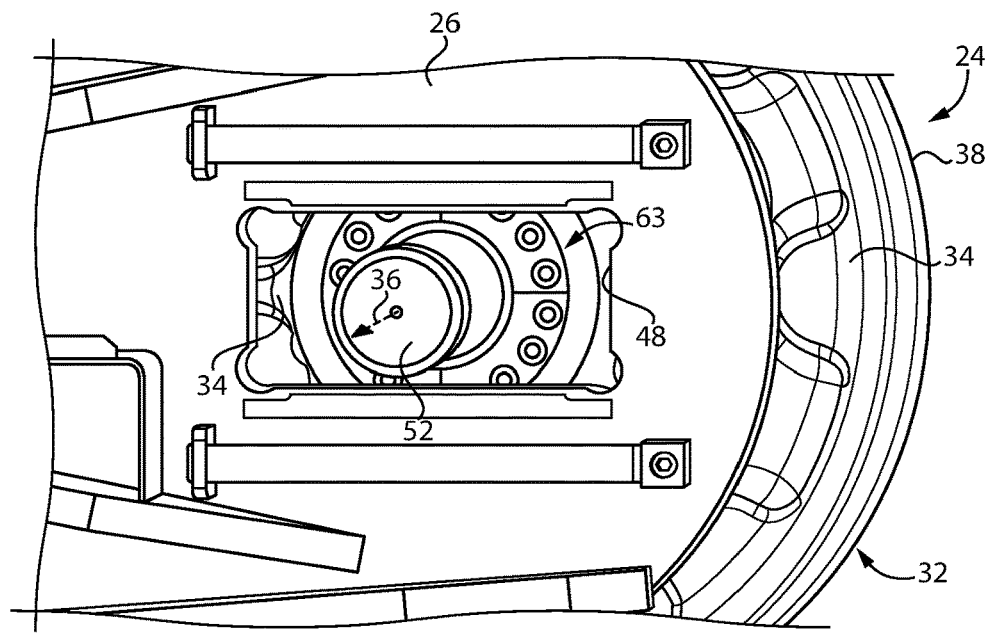
FIG. 2 is a side diagrammatic view of a ground-engaging track system, according to one embodiment.
Figure 3:
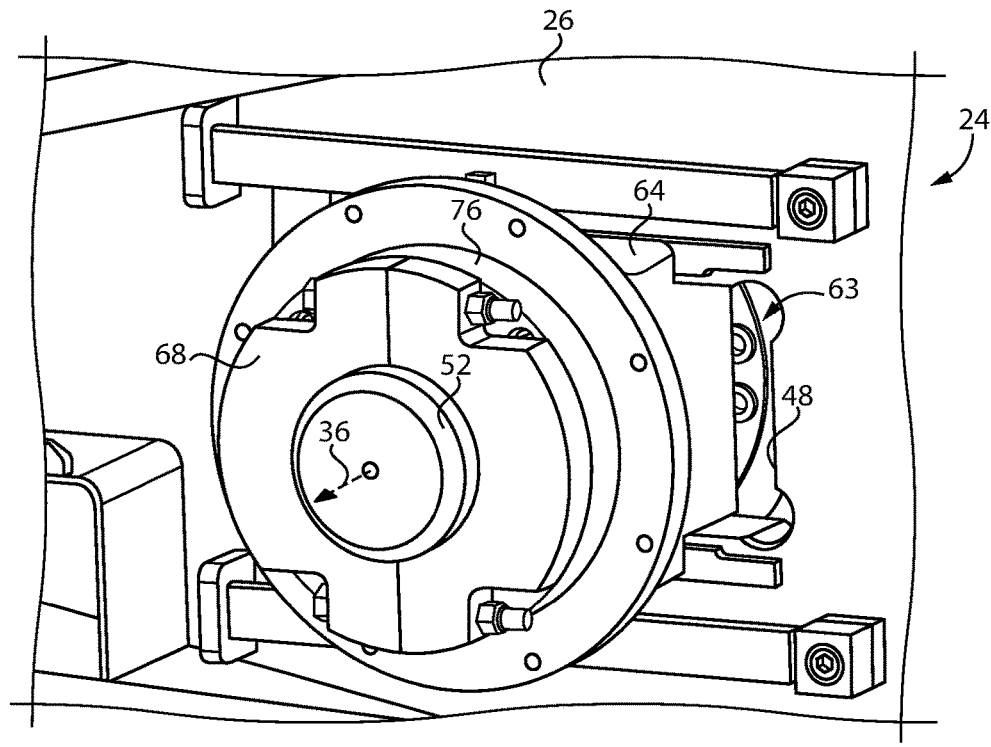
FIG. 3 is another diagrammatic view of a ground-engaging track system, according to one embodiment.
Figure 4:
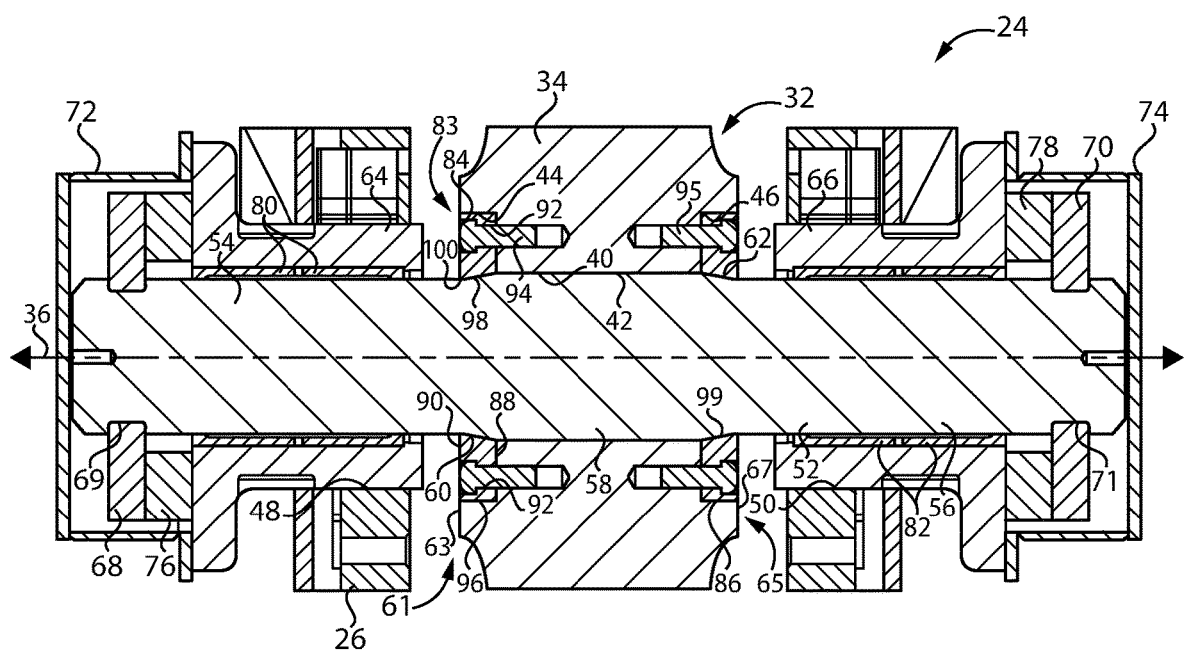
FIG. 4 is a sectioned diagrammatic view of a ground-engaging track system, according to one embodiment.

Referring also now to FIGS. 2-4, track roller frame 26 may have a first window 48 and a second window 50 formed therein. Windows 48 and 50 provide support for roller assembly 32 and related components, as well as providing access for servicing or replacement, as further discussed herein. Roller 34 defines a roller center axis 36, and includes an outer tread surface 38 structured to contact track 28 during operation, and an inner roller surface 40. Inner roller surface 40 extends circumferentially around and is centered on roller center axis 36 and forms a shaft bore 42, a first collar bore 44 and a second collar bore 46. Collar bores 44 and 46 are in communication with shaft bore 42 and extend axially outward of shaft bore 42 to a first axial side 61 of roller 34 and to a second axial side 65 of roller 34, respectively. First axial side 61 includes a first axial side surface 63 and second axial side 65 includes a second axial side surface 67. Roller shaft 52 includes a first shaft end 54, a second shaft end 56, and a middle roller support section 58 extending between first shaft end 54 and second shaft end 56. Roller shaft 52 will also be understood to define a longitudinal axis co-numbered with center axis 36, and is coaxially arranged with roller 34 having middle roller support section 58 positioned within shaft bore 42.

Ground-engaging track system 24 (hereinafter "track system 24") further includes a first bearing block 64 within window 48 and supporting first shaft end 54 for rotation, and a first end retainer 68 attached to first shaft end 54 at a location axially outward of first bearing block 64. Track system 24 further includes a second bearing block 66 within window 50 and supporting second shaft end 56 for rotation, and a second end retainer 70 attached to second shaft end 56 at a location axially outward of second bearing block 66. "Axially outward" means a direction along or parallel to center axis 36, away from a center point of center axis 36. "Axially inward" has an opposite meaning. In the illustrated embodiment, each of first end retainer 68 and second end retainer 70 includes a split end retainer having multiple pieces clamped such as by bolting to the respective shaft end, and seated in a circumferential groove 67 and 71, respectively, on first shaft end 54 and second shaft end 56. A first plate 76 is sandwiched between first end retainer 68 and first bearing block 64, and a second plate 78 is sandwiched between second end retainer 70 and second bearing block 66, for reacting thrust loads on roller assembly 34 to bearing blocks 64 and 66, and to track roller frame 26. One or more journal bearings 80 are positioned within first bearing block 64, and one or more journal bearings 82 are positioned within second bearing block 66, and rotatably journal the respective first shaft end 54 and second shaft end 56. First bearing block 64 may have an outside rectangular shape and second bearing block 66 may also have an outside rectangular shape, with the respective bearing blocks positioned within windows 48 and 50 having suitable complementary or corresponding rectangular shapes. A first cover 72 may be coupled to first bearing block 64, and a second cover 74 coupled to second bearing block 66.

Figure 5:
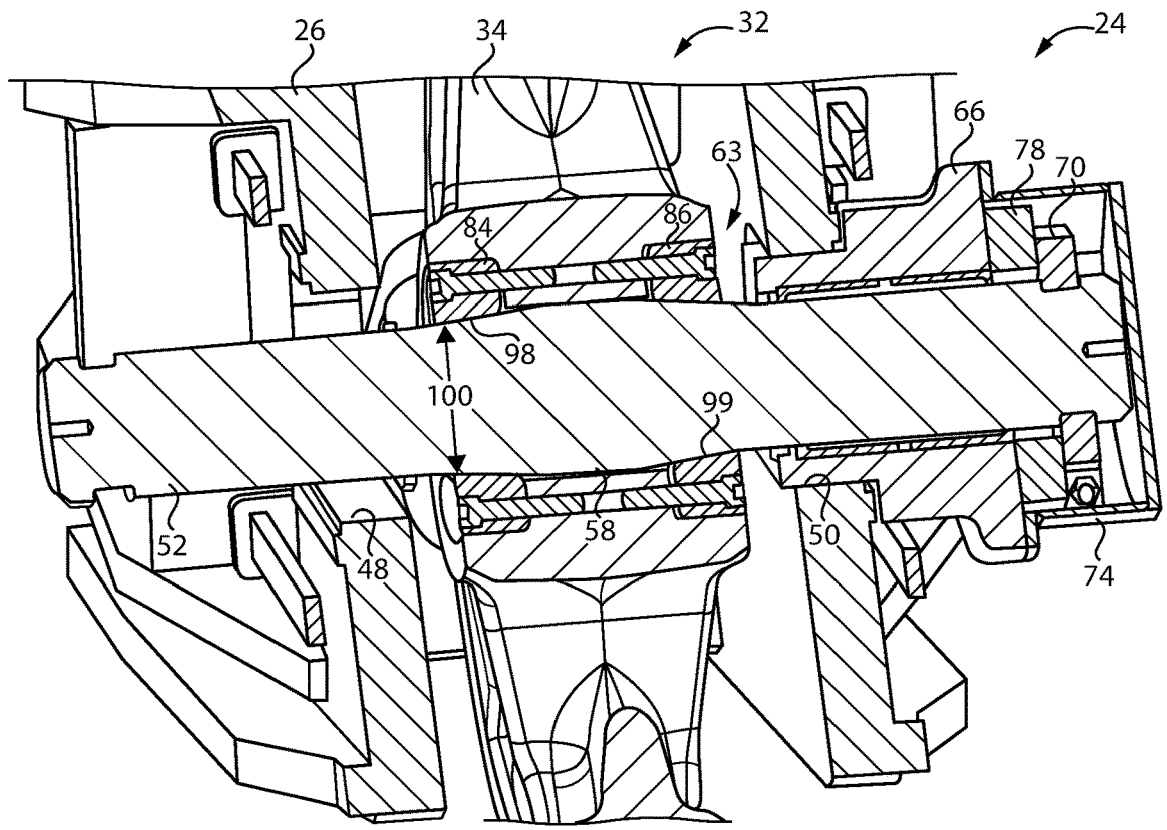
FIG. 5 is a sectioned diagrammatic view, in perspective, of a ground-engaging track system, according to one embodiment.

Referring also now to FIG. 5, roller shaft 52 further includes a first circumferential ramp surface 60 transitioning between first shaft end 54 and middle roller support section 58. Circumferential ramp surface 60 is circumferential of center axis 36 and is enlarged in diameter in a direction, an axially inward direction, of middle roller support section 58. Roller shaft 52 may also include a second circumferential ramp surface 62 transitioning between second shaft end 56 and middle roller support section 58. Second circumferential ramp surface 62 is also circumferential of center axis 36, and enlarged in diameter in a direction, an axially inward direction, of middle roller support section 58. In some embodiments, each of first circumferential ramp surface 60 and second circumferential ramp surface 62 has a conical shape. Thus, first shaft end 54 and second shaft end 56 may each be cylindrical, and middle roller support section 58 also cylindrical, with first circumferential ramp surface 60 and second circumferential ramp surface 62 having conical shapes transitioning from the respective cylindrical shaft ends 54 and 56 to the cylindrical enlarged middle roller support section 58.

Track system 24 and roller assembly 32 further include a roller retention system 83 as noted above. Roller retention system 83 includes a first roller retention collar 84 and a second roller retention collar 86. First roller retention collar 84 and second roller retention collar 86 may be substantially identical, and thus description herein of one can be understood to refer by way of analogy to the other. In a practical implementation strategy two roller retention collars are used. In some embodiments, however, a single roller retention collar could be used. Roller retention collar 84 includes a roller-facing inside axial surface 88 ("inside surface 88"), an outside axial surface 90 ("outside surface 90"), and bolt holes 92 extending between inside surface 88 and outside surface 90. A first set of bolts 94 are shown in the drawings clamping roller retention collar 84 to roller 34, and a second set of bolts 95 clamping roller retention collar 86 to roller 34. Bolt holes 92 can be shaped such that heads of bolts 94 (and 95) are recessed when installed, thus bolt holes 92 and counterpart bolt holes in roller retention collar 86 define axially inward bolting directions. Roller retention collar 84 is thus positioned upon first axial side 61 and clamped in contact with first axial side surface 63. Roller retention collar 86 is positioned upon second axial side 65 and clamped in contact with second axial side surface 67. The clamping of roller retention collar 84 and roller retention collar 86 and friction fitting upon roller shaft 52 in the manner described traps roller 34, between collars 84 and 86, against axial displacement upon roller shaft 52, and also fixes roller 34 and roller shaft 52 to rotate together such that roller shaft 52 is a live shaft relative to track roller frame 26.

Roller retention collar 84 further includes an outer peripheral surface 96 sized to fit roller retention collar 84 within collar bore 44. In a practical implementation, roller retention collar 84 can be sized so as to have a clearance fit with inner roller surface 40 within collar bore 44, prior to clamping during installation. As further discussed herein, installation and clamping of roller retention collar 84, and analogously installation of roller retention collar 86, produces a wedging effect of roller retention collar 84 upon roller shaft 52 to result in the desired fixed coupling of roller 34 and roller shaft 52. To this end, roller retention collar 84 further includes an inner peripheral wedge surface 98 extending circumferentially around center axis 36 and forming a shaft hole 100 for positioning roller retention collar 84 upon roller shaft 52. Roller retention collar 86 also includes an inner peripheral wedge surface 99 forming a shaft hole (not numbered) for positioning roller retention collar 86 upon roller shaft 52. Shaft hole 100 is enlarged in diameter in a direction of inside surface 88 and sized to friction fit roller retention collar 84 upon circumferential ramp surface 60 such that axial displacement of roller 34 upon roller shaft 52 is limited. Each of roller retention collar 84 and roller retention collar 86 may be coaxially arranged about roller shaft 52 and clamped to the respective axial side 61 and 65, and friction-fitted upon the respective first circumferential ramp surface 60 and second circumferential ramp surface 62, based on clamped contact between first inner peripheral wedge surface 98 and circumferential ramp surface 60 and clamped contact between inner peripheral wedge surface 99 and circumferential ramp surface 62. As noted above shaft hole 100 is enlarged in diameter in a direction, an axially inward direction in the assembled configurations of the drawings, of inside surface 88. The term "sized" to friction fit means that shaft hole 100 is neither too small for roller retention collar 84 to fit over first shaft end 54, nor too large for roller retention collar 84 to fit over middle roller support section 58. It can thus be appreciated that when roller retention collar 84 is installed in roller assembly 32, first set of bolts 94 can be tightened to clamp roller retention collar 84 to first axial side 61 while simultaneously engaging inner peripheral wedge surface 98 against circumferential ramp surface 60 and outer peripheral surface 96 in contact with inner roller surface 40. It will further be appreciated that by clamping both of roller retention collar 84 and roller retention collar 86 to roller 34 in this fashion, roller retention collars 84 and 86 will be drawn axially inward toward one another and at the same time squeeze both axially and radially against middle roller support section 58, producing the friction fits that fix roller 34 and roller shaft 52 together in the manner described.

Figures 6, 7:
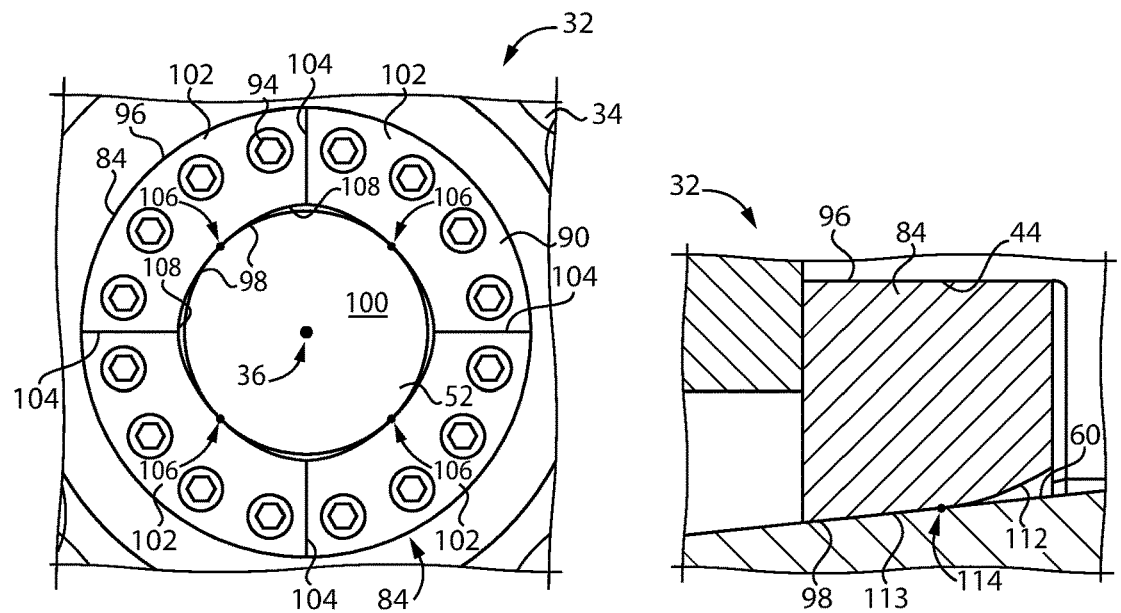
FIG. 6 is a side diagrammatic view of a portion of a roller assembly for a ground-engaging track system, according to one embodiment.
FIG. 7 is a sectioned diagrammatic view of a portion of a roller assembly for a ground-engaging track system, according to one embodiment.

Referring also now to FIG. 6, roller retention collar 84 is depicted as it might appear in a side view bolted to roller 34 and positioned about roller shaft 52. Roller retention collar 84 defines a collar center axis collinear with roller center axis 36 and thus shown again with reference numeral 36, and may include at least one relief channel 104. The at least one relief channel 104 extends axially from outside surface 90, into the plane of the page in FIG. 6, to inside surface 88. The at least one relief channel 104 further extends radially between outer peripheral surface 96 and inner peripheral wedge surface 98. In the illustrated embodiment roller retention collar 84 includes a multi-piece collar having a plurality of arcuate collar segments 102 and a plurality of relief channels 104 formed between adjacent ones of the plurality of arcuate collar segments 102. Each relief channel 104 may extend axially entirely through roller retention collar 84, and entirely radially through roller retention collar 84. Embodiments are contemplated where relief channels 104 extend only part way radially through roller retention collar 84, however. During assembly and clamping of roller retention collar 84 the one or more relief channels 104 can enable some relative movement between or amongst collar segments 102 to enable roller retention collar 84 to squeeze against circumferential ramp surface 60 and inner roller surface 40.

Also illustrated in FIG. 6 are contact points 106 between collar segments 102 and roller shaft 52. An inside contour of inner peripheral wedge surface 98 may vary circumferentially around axis 36, and as can been seen in FIG. 6, varies from radially inward contact points 106 to radially outward clearance locations 108. Points 106 may define a circle with clearance locations 108 representing radially outward deviations from the circle defined by contact points 106. The circumferentially varying contour of inner peripheral wedge surface 98 can assist in making clamping forces relatively more uniform circumferentially around circumferential ramp surface 60, as roller retention collar 84 is clamped into engagement with roller 34 and roller shaft 52 and inner peripheral wedge surface 98 deforms into a more conical shape, for example.

Referring also now to FIG. 7, there is shown a view in longitudinal profile, in a section plane that would include center axis 36, of inner peripheral wedge surface 98 in contact with circumferential ramp surface 60. It can be seen from FIG. 7 that inner peripheral wedge surface 98 has a contour varying longitudinally along center axis 36. In other words, inner peripheral wedge surface 98 does not extend strictly parallel in its entirety to circumferential ramp surface 60, but instead includes a relieved surface or section 112 transitioning with a conical section 113 at a transition point 114. Transition point 114 may be located approximately at a mid-point of a length of circumferential ramp surface 60 in a longitudinal direction. Relief surface 112 may be an arcuate, longitudinally radiused, surface, diverging away from conical surface 113 in a radially outward direction. The contour of inner peripheral wedge surface 98, varied longitudinally along center axis 36, can assist in making clamping forces at the interface of circumferential ramp surface 60 and inner peripheral wedge surface 98 relatively more uniform in a longitudinal direction.

Figure 8:
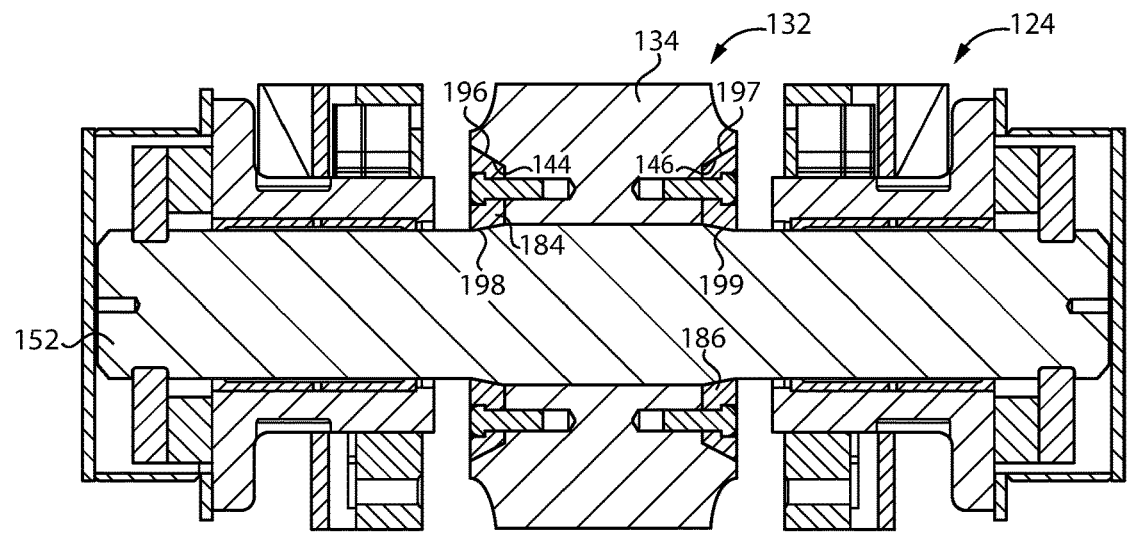
FIG. 8 is a sectioned diagrammatic view of a ground-engaging track system, according to another embodiment.

Referring now to FIG. 8, there is shown a ground-engaging track system 124 including a roller assembly 132 according to another embodiment. Roller assembly 132 includes a roller 134, which may be an idler roller having an outer tread surface not visible in FIG. 8, and a roller shaft 152. Bearing blocks and retainers and other structures are shown in FIG. 8 and not specifically numbered but may substantially be identical to those described in connection with the foregoing embodiments. Roller shaft 152 may likewise be identical in at least some instances to roller shaft 52 discussed above. Roller assembly 132 includes a first retention collar 184 and a second retention collar 186 each having an inner peripheral wedge surface 198 and 199, respectively. Whereas the outer peripheral surfaces of roller retention collars 84 and 86 discussed above may be cylindrical or substantially cylindrical, roller retention collars 184 and 186 each include an outer peripheral wedge surface 196 and 197, respectively, which may be conical or at least partially conical, and enlarged in diameter in a direction of an outside surface of the respective roller retention collar 184 and 186. Roller 134 has a first collar bore 144 and a second collar bore 146, with roller retention collars 184 and 186 positioned therein in contact with an inner roller surface of roller 134, and clamped to roller 134 to provide a double wedge retention of roller 134 upon roller shaft 152.

Figure 9:
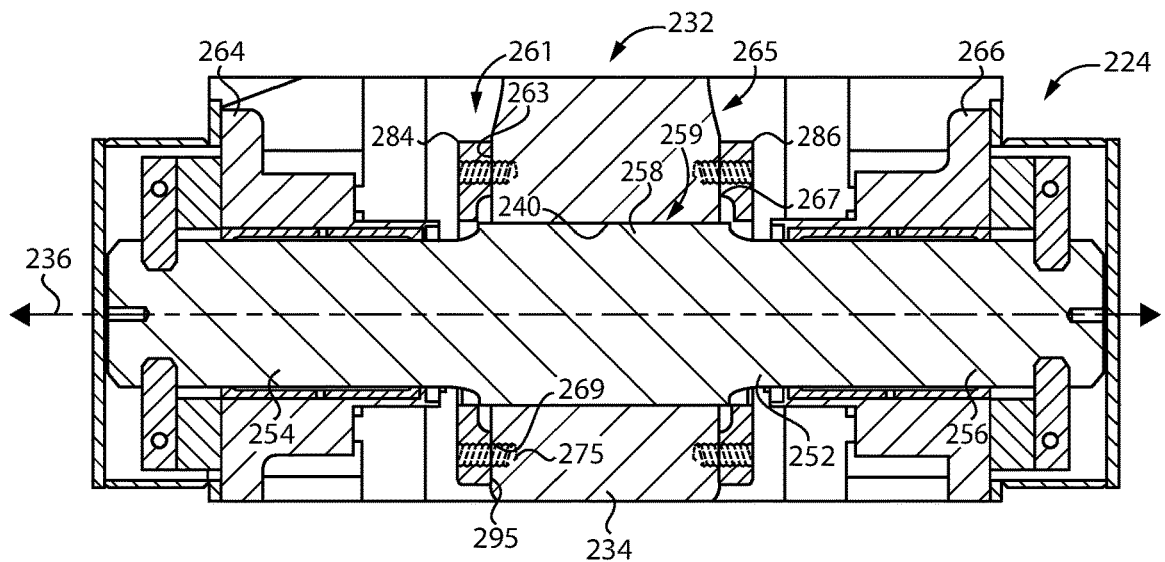
FIG. 9 is a sectioned diagrammatic view of a ground-engaging track system, according to yet another embodiment.
Figure 10:
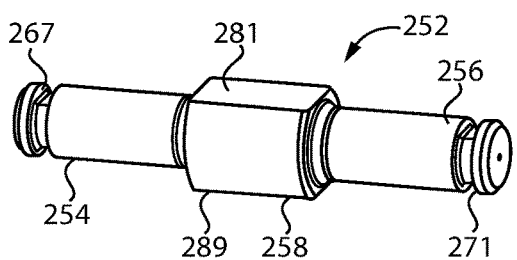
FIG. 10 is a diagrammatic view of a roller shaft for a roller assembly in a ground-engaging track system as in FIG. 9.
Figure 11:
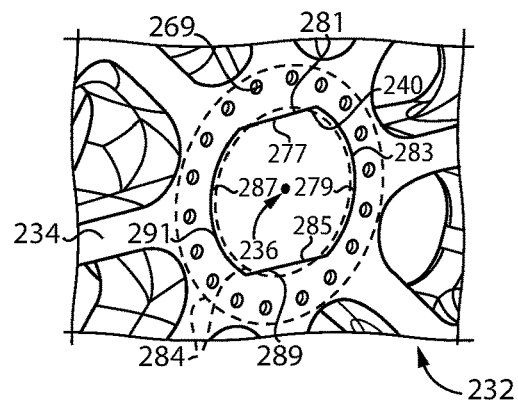
FIG. 11 is a diagrammatic view of a portion of a roller assembly in a ground-engaging track system as in FIG. 9.

Referring now to FIGS. 9-11 there is shown a ground-engaging track system 224 including a roller assembly 232 according to another embodiment. Roller assembly 232 includes a roller 234, which may be an idler roller, defining a center axis 236 and an inner roller surface 240. A roller shaft 252 extends through roller 234 and includes a first shaft end 254, a second shaft end 256, and a middle roller support section 258. Roller 234 will be understood to include an outer tread surface, an inner roller surface 240 forming a shaft bore, and certain other features identical to or analogous to those described in connection with the foregoing embodiments. A first bearing block 264 and a second bearing block 266 and other components supporting roller assembly 232 may also be identical or substantially identical to those described in connection with foregoing embodiments. Roller 234 includes a first axial side 261 having a first side surface 263, and a second axial side 265 having a second side surface 267. A first retention collar 284 is coaxially arranged about roller shaft 252 and clamped to first axial side 261 in axial facing contact with both of first side surface 263 and middle roller support section 258, such that roller 234 is fixed against axial displacement upon roller shaft 252 in a first direction. A second retention collar 286 is coaxially arranged about roller shaft 252 and clamped to second axial side 265 in contact with both of second side surface 267 and middle roller support section 258, such that roller 234 is fixed against axial displacement upon roller shaft 252 in a second direction opposite to the first direction.

First retention collar 284 includes a roller-facing inside surface 295 in contact with first side surface 263 and in contact with middle roller support section 258. Second retention collar 286 may be substantially identical to first retention collar 284. Bolt holes 269 are formed in roller 234 and receive bolts 275 clamping first retention collar against first axial side 261. Additional bolt holes (not numbered) may be formed in second axial side 265 for clamping second retention collar 286 in an analogous manner. Inner roller surface 240 may include a flat inner surface 277 and an arcuate inner surface 279, and middle roller support section 258 may include a flat outer surface 281 and an arcuate outer surface 283 in facing relation, respectively, to flat inner surface 277 and arcuate inner surface 285. Middle roller support section 258, together with roller 234, forms a keyed roller-to-shaft joint 259 fixing roller 234 and roller shaft 252 against relative rotation, such that roller shaft 252 is a live shaft within an associated track roller frame and bearing blocks 264 and 266. Inner roller surface 240 may further include a second flat inner surface 285 and a second arcuate inner surface 287, with middle roller support section 258 further including a second flat outer surface 289 and a second arcuate outer surface 291 in facing relation, respectively, to flat inner surface 285 and arcuate inner surface 287. A first groove 267 may be formed on first shaft end 254 and a second groove 271 formed on second shaft end 256, for receiving end retainers.

Phantom lines 284 are shown in FIG. 11 representing a footprint of contact of retention collar 284 against roller shaft 252 and roller 234. It can be seen that when retention collar 284 is installed for service that inside surface 295 will butt up against both middle roller support section 258 and roller 234. Second retention collar 286 may be analogously configured, such that both retention collar 284 and retention collar 286 will be in contact with middle roller support section 258 at locations angularly aligned, circumferentially around, center axis 236, with arcuate inner surfaces 279 and 287 and arcuate outer surfaces 283 and 291, and in contact with first side surface 263 and second side surface 267, respectively, at locations angularly aligned, circumferentially around center axis 263, with flat inner surfaces 277 and 285 and flat outer surfaces 281 and 289.

INDUSTRIAL APPLICABILITY

Referring to the drawings generally, it will be recalled that roller assemblies according to the present disclosure may be installed for service in a ground-engaging track system and supported for rotation without the use of thrust washers, thrust bearings, or plates positioned to contact the subject roller. It will also be recalled that windows formed in a track roller frame provide for accessing and servicing or replacement of a roller assembly. In one practical application, roller assemblies according to the present disclosure may be provided as a retrofit assembly to be installed in a machine in place of an existing roller assembly. In the case of certain machine types, including shovels and the like used in mining applications, simplified service and retrofit applications that require as little downtime as possible and can be performed in the field are often welcomed by the industry. One challenge to field serviceability of these and other ground-engaging track systems is the need to fit certain pieces and parts of equipment through windows formed in the track roller frame. In accordance with the present disclosure, a new idler roller can be swapped in for an existing idler roller, and the components necessary to mount and support the idler roller in the track roller frame passed through windows in the track roller frame. By eliminating the use of thrust washers or the like positioned inside a track roller frame, assembly can be simplified with a reduced number of components as compared to certain designs, as well as a more robust overall ground-engaging track system.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A roller assembly for a ground-engaging track system comprising:
   a roller defining a roller center axis and including an outer tread surface, and an inner roller surface forming a shaft bore and a collar bore extending axially outward of the shaft bore;
   a roller shaft including a first shaft end, a second shaft end, a middle roller support section, and a circumferential ramp surface transitioning between the first shaft end and the middle roller support section and enlarged in diameter in a direction of the middle roller support section;
   a roller retention collar including a roller-facing inside surface, an outside surface, and bolt holes extending between the roller-facing inside surface and the outside surface, for clamping the roller retention collar to the roller;
   the roller retention collar further including an outer peripheral surface sized to fit the retention collar within the collar bore, and an inner peripheral wedge surface forming a shaft hole for positioning the roller retention collar upon the roller shaft; and
   the shaft hole being enlarged in diameter in a direction of the roller-facing inside surface and sized to friction fit the roller retention collar upon the circumferential ramp surface, such that axial displacement of the roller upon the roller shaft is limited.

2. The roller assembly of claim 1 wherein:
   the roller shaft further includes a second circumferential ramp surface transitioning between the second shaft end and the middle roller support section; and
   the roller assembly further comprises a second roller retention collar having an inner peripheral wedge surface sized to friction fit the second roller retention collar upon the second circumferential ramp surface.

3. The roller assembly of claim 2 further comprising:
   a first set of bolts clamping the first roller retention collar to a first axial side of the roller and friction-fitting the first roller retention collar upon the first circumferential ramp surface; and
   a second set of bolts clamping the second roller retention collar to a second axial side of the roller and friction-fitting the second roller retention collar upon the second circumferential ramp surface.

4. The roller assembly of claim 3 wherein the roller includes an idler.

5. The roller assembly of claim 4 further comprising:
   a first bearing block supporting the first shaft end for rotation, and a first end retainer attached to the first shaft end at a location axially outward of the first bearing block; and
   a second bearing block supporting the second shaft end for rotation, and a second end retainer attached to the second shaft end at a location axially outward of the second bearing block.

6. The roller assembly of claim 1 wherein the roller retention collar defines a collar center axis, and includes at least one relief channel extending axially from the outside surface to the roller-facing inside surface and extending radially between the outer peripheral surface and the inner peripheral wedge surface.

7. The roller assembly of claim 6 wherein the roller retention collar includes a multi-piece collar having a plurality of arcuate collar segments and a plurality of relief channels formed between adjacent ones of the plurality of arcuate collar segments.

8. The roller assembly of claim 1 wherein the circumferential ramp surface has a conical shape.

9. The roller assembly of claim 8 wherein the inner peripheral wedge surface has a contour varying circumferentially around the collar axis and longitudinally along the collar axis.

10. The roller assembly of claim 1 wherein the outer peripheral surface forms a second circumferential wedge surface enlarged in diameter in a direction of the outside surface.

11. A ground-engaging track system comprising:
    a roller assembly including a roller defining a roller center axis and having a shaft bore extending between a first axial side and a second axial side of the roller, and a roller shaft;
    the roller shaft including a first circumferential ramp surface, a second circumferential ramp surface, and a middle roller support section extending between the first circumferential ramp surface and the second circumferential ramp surface and positioned within the shaft bore;
    a roller retention system including a first retention collar positioned about the roller shaft upon the first axial side and having a first inner peripheral wedge surface, and a second retention collar positioned about the roller shaft upon the second axial side and having a second inner peripheral wedge surface;
    the first retention collar is clamped to the first axial side of the roller and friction-fitted upon the first circumferential ramp surface based on clamped contact between the first inner peripheral wedge surface and the first circumferential ramp surface; and
    the second retention collar is clamped to the second axial side of the roller and friction-fitted upon the second circumferential ramp surface based on clamped contact between the second inner peripheral wedge surface and the second circumferential ramp surface.

12. The track system of claim 11 wherein the roller includes an idler and is trapped against axial displacement upon the roller shaft between the first retention collar and the second retention collar, and fixed to rotate with the roller shaft based on the friction-fitting of the first retention collar and the second retention collar.

13. The track system of claim 12 further comprising:
    a roller frame having a first window formed therein at a location spaced axially outward of the first axial side of the roller and a second window formed therein at a location spaced axially outward of the second axial side of the roller;

a first bearing block within the first window and a second bearing block within the second window, and the first bearing block and the second bearing block together supporting the roller shaft and the roller for rotation; and a first end retainer attached to the roller shaft at a location axially outward of the first bearing block, and a second end retainer attached to the roller shaft at a location axially outward of the second bearing block.

14. The track system of claim 11 wherein at least one of the first retention collar or the second retention collar has a relief channel formed therein.

15. The track system of claim 11 wherein at least one of the first retention collar or the second retention collar includes a multi-piece collar having a plurality of arcuate collar segments.

16. The track system of claim 11 wherein:
the roller includes an inner roller surface forming a shaft bore, a first collar bore extending axially outward of the shaft bore to the first axial side, and a second collar bore extending axially outward of the shaft bore to the second axial side; and
the first retention collar is within the first collar bore and the second retention collar is within the second collar bore.

17. The track system of claim 16 wherein each of the first retention collar and the second retention collar includes an outer peripheral surface that is cylindrical and in contact with the inner roller surface within the respective first collar bore and second collar bore.

18. The track system of claim 16 wherein each of the first retention collar and the second retention collar includes an outer peripheral wedge surface in contact with the inner roller surface within the respective first collar bore and second collar bore.

19. A roller assembly for a ground-engaging track system comprising:

a roller defining a roller center axis and including an outer tread surface, and an inner roller surface forming a shaft bore extending between a first axial side of the roller having a first side surface and a second axial side of the roller having a second side surface;

a roller shaft having a first shaft end, a second shaft end, and a middle roller support section that is enlarged relative to the first shaft end and the second shaft end and positioned within the shaft bore, and the middle roller support section, together with the roller, forming a keyed roller-to-shaft joint fixing the roller and the roller shaft against rotation relative to one another;

a first retention collar coaxially arranged about the roller shaft and clamped to the first axial side of the roller in axial facing contact with both of the first side surface and the middle roller support section, such that the roller is fixed against axial displacement upon the roller shaft in a first direction; and a second retention collar coaxially arranged about the roller shaft and clamped to the second axial side of the roller in contact with both of the second side surface and the middle roller support section, such that the roller is fixed against axial displacement upon the roller shaft in a second direction.

20. The roller assembly of claim 19 wherein:
the inner roller surface includes a flat inner surface and an arcuate inner surface, and the middle roller support section includes a flat outer surface and an arcuate outer surface in facing relation, respectively, to the flat inner surface and the arcuate inner surface; and
the first retention collar and the second retention collar are in contact with the first side surface and the second side surface, respectively, at locations angularly aligned, circumferentially around the roller center axis, with the flat inner surface and the flat outer surface, and in contact with the middle roller support section at locations angularly aligned, circumferentially around the roller center axis, with the arcuate inner surface and the arcuate outer surface.

* * * * *